US009734969B2

(12) United States Patent
Wehrheim

(10) Patent No.: US 9,734,969 B2
(45) Date of Patent: Aug. 15, 2017

(54) CENTRIFUGAL ACTUATOR SWITCH WITH A LIMITER FOR SPRING MOVEMENT

(71) Applicant: Nidec Motor Corporation, St. Louis, MO (US)

(72) Inventor: Robert Wehrheim, Wentzville, MO (US)

(73) Assignee: Nidec Motor Corporation, St. Louis, MO (US)

( * ) Notice: Subject to any disclaimer, the term of this patent is extended or adjusted under 35 U.S.C. 154(b) by 671 days.

(21) Appl. No.: 14/270,627

(22) Filed: May 6, 2014

(65) Prior Publication Data
US 2015/0325395 A1 Nov. 12, 2015

(51) Int. Cl.
*H01H 35/10* (2006.01)
*H02K 11/00* (2016.01)
*H02K 11/23* (2016.01)

(52) U.S. Cl.
CPC ......... *H01H 35/10* (2013.01); *H02K 11/0036* (2013.01); *H02K 11/23* (2016.01)

(58) Field of Classification Search
CPC ......... H02K 11/00; H02K 11/23; H02H 35/10
USPC ...... 310/68 E; 318/793; 200/80 R, 329, 335, 200/336
See application file for complete search history.

(56) References Cited

U.S. PATENT DOCUMENTS

| | | | |
|---|---|---|---|
| 3,038,109 A * | 6/1962 | Mowery, Jr. ........... | H02K 7/102 188/187 |
| 4,205,245 A | 5/1980 | Hildebrandt et al. | |
| 4,242,607 A * | 12/1980 | Hildebrandt ........... | H01H 35/10 200/80 R |
| 4,661,732 A * | 4/1987 | Gehrt ..................... | H02K 11/23 200/80 R |
| 5,293,090 A * | 3/1994 | Heilman ................ | H02K 11/23 200/80 R |
| 5,602,436 A * | 2/1997 | Sherman ................ | H02K 11/23 310/68 A |
| 5,744,883 A * | 4/1998 | Lewis .................... | H01H 35/10 200/335 |
| 6,201,325 B1 * | 3/2001 | Logsdon ................ | H02K 11/23 200/80 R |
| 6,710,478 B1 | 3/2004 | Lewis et al. | |

* cited by examiner

*Primary Examiner* — John K Kim
*Assistant Examiner* — Minki Chang
(74) *Attorney, Agent, or Firm* — Maginot Moore & Beck LLP

(57) ABSTRACT

A centrifugal actuator switch includes a sleeve having a collar on which two protuberances are formed. Each protuberance engages a biasing member to limit movement of the biasing member when weighted lever arms of the switch are extended by centrifugal force as they rotate at a predetermined rotational speed.

8 Claims, 5 Drawing Sheets

CENTRIFUGAL ACTUATOR SWITCH WITH A LIMITER FOR SPRING MOVEMENT

TECHNICAL FIELD

This disclosure relates generally to electrical motors, and more particularly, to centrifugal actuator switches used in electrical motors.

BACKGROUND

In many conventional electric motors, a rotating magnetic field is produced by passing an electrical current through a main winding formed about a stator to torque a rotor rotationally. A start winding can be included within the stator assembly of the motor to produce the rotating magnetic field with sufficient torque to begin rotation of the rotor. Once the rotor approaches its predetermined operational speed, a switch responsive to the rotational speed of the motor is opened to remove the electrical current from the start winding. Upon the motor speed slowing below another predetermined speed of operation from, for example, load conditions on the motor or shut down of the motor, the switch closes so electrical current can energize the start winding of the motor again.

One known switch used to apply and then remove electrical current from a start winding is a centrifugal actuator switch. The contacts of the switch are initially closed to enable electrical current to flow through the main and start windings of the electrical motor. The switch has a bracket, which is fixedly mounted about the output shaft of the motor, so the switch rotates with the rotor. A sleeve is mounted above the bracket for axial movement along the bracket on the output shaft. A pair of weighted levers is pivotally mounted on the sleeve. As the rotational speed of the bracket on the output shaft approaches the predetermined operational speed, centrifugal force produced by the rotation of the output shaft and bracket causes the weights to pivot on the sleeve. The pivoting of the weighted levers shifts the sleeve axially along the bracket and the output shaft of the motor. This axial movement of the sleeve from an initial, sometimes known as the starting, position to a second, sometimes called a run, position as the rotational speed of the output shaft accelerates to its predetermined operational speed, opens the contacts of the switch to terminate the flow of electrical current through the start winding, while electrical current continues to flow through the main winding through another set of contacts in the switch. The lever arms are biased towards one another by a pair of springs mounted on diametrically opposite sides of the sleeve. One end of each spring is attached to a lever hook extending from one of the weighted levers on diametrically opposed sides of the sleeve and the other end of each spring is similarly attached to a lever hook extending from the other weighted arm at a diametrically opposed side of the sleeve. As the rotational speed of the output shaft slows, the centrifugal force acting on the weighted levers is reduced and the springs pull the lever arms towards each other so they pivot and return to their starting position, which causes the sleeve to return to its starting position on the bracket for the next start-up of the motor.

Some electrical motors are used in common appliances. For example, clothes dryers and washers use an electrical motor to rotate a drum in which wet clothes are placed for drying or washing, respectively. The motors in these appliances typically include a centrifugal actuator switch to start the motor and then remove electrical power from the start winding as described above. Vibrations arising from unbalanced loads and other conditions can subject the motors and related components, such as the centrifugal actuator switch, to significant stresses. One problem arising from these vibrations is movement of the ends of the springs biasing the lever arms of the centrifugal actuator switch against the lever hooks on the weighted levers. The resulting rubbing of the spring material against the lever hooks can cause the end of the spring or the end of the lever hook to break and release the biasing force. As a consequence, the switch no longer performs reliably and the motor is unable to start. Therefore, constructing a centrifugal actuator switch capable of better withstanding the stresses arising from vibrations in the motor is desirable.

SUMMARY

A centrifugal actuator switch with a spring movement limiter reduces movement of the springs biasing the lever arms on the switch to reduce the likelihood of the spring or lever hook breaking. The centrifugal actuator switch includes a sleeve configured for axial movement about an output shaft of an electrical motor, the sleeve having a first end and a second end with a cylindrical bore extending from the first end of the sleeve to the second end of the sleeve, a collar positioned about one end of the sleeve, a pair of weighted lever arms pivotally mounted on diametrically opposed sides of the sleeve, a pair of biasing members, each biasing member being operatively connected between the lever arms on diametrically opposed sides of the sleeve, and a pair of protuberances, each protuberance extending from a surface of the collar, each protuberance being positioned on diametrically opposed sides of the sleeve to enable each protuberance to engage one of the biasing members in response to the sleeve moving in response to the weighted lever arms pivoting about the sleeve as the output shaft rotates at a first predetermined speed.

An electrical motor includes a centrifugal actuator switch having a spring movement limiter that reduces movement of the springs biasing the lever arms on the switch to reduce the likelihood of the spring breaking. The motor includes an output shaft, a rotor mounted about the output shaft, and a centrifugal actuator switch including: a sleeve configured for axial movement about the output shaft of the electrical motor, the sleeve having a first end and a second end with a cylindrical bore extending from the first end of the sleeve to the second end of the sleeve, a collar positioned about one end of the sleeve, a pair of weighted lever arms pivotally mounted on diametrically opposed sides of the sleeve, a pair of biasing members, each biasing member being operatively connected between the weighted lever arms on diametrically opposed sides of the sleeve, and a pair of protuberances, each protuberance extending from a surface of the collar, each protuberance being positioned on diametrically opposed sides of the sleeve to enable each protuberance to engage one of the biasing members in response to the sleeve moving in response to the weighted arms pivoting about the sleeve as the output shaft rotates at a first predetermined speed.

DETAILED DESCRIPTION

Figure 1:
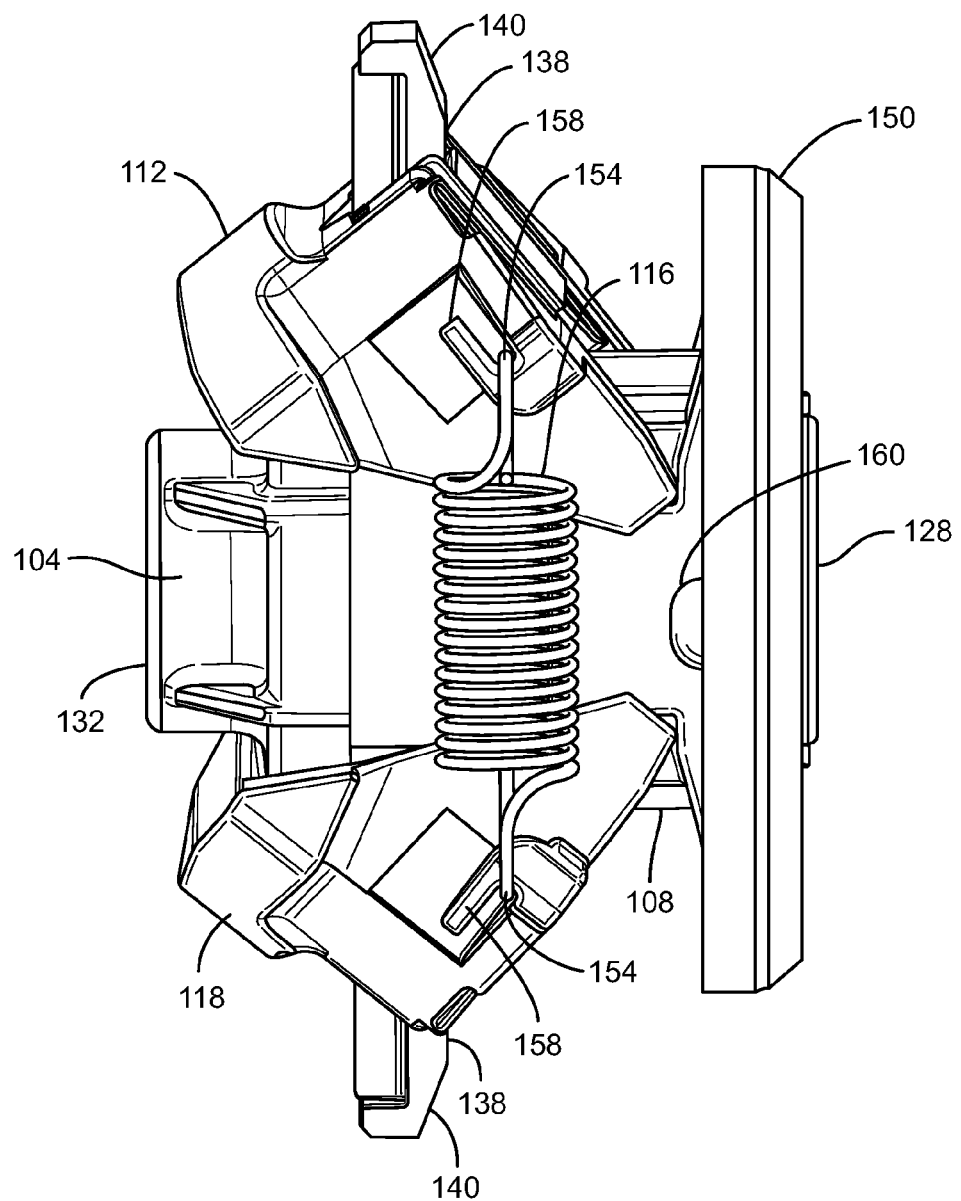
FIG. 1 is a perspective side view of a centrifugal actuator switch having a protuberance to limit movement of a biasing arm caused by vibrations.

An improved centrifugal actuator switch is shown in FIG. 1. The switch 100 includes a bracket 104, sleeve 108, weighted lever arm 112, weighted lever arm 118, and a biasing member 116. The bracket 104 has a first end 128 and a second end 132 with a cylindrical bore 136 (FIG. 2) extending from the first end 128 of the bracket to the second end 132 of the bracket 104. A pair of arms 140 extends from the bracket 104. The bracket 104 is configured for being mounted fixedly about an output shaft of an electrical motor to enable the bracket to rotate with the output shaft.

Figure 4:
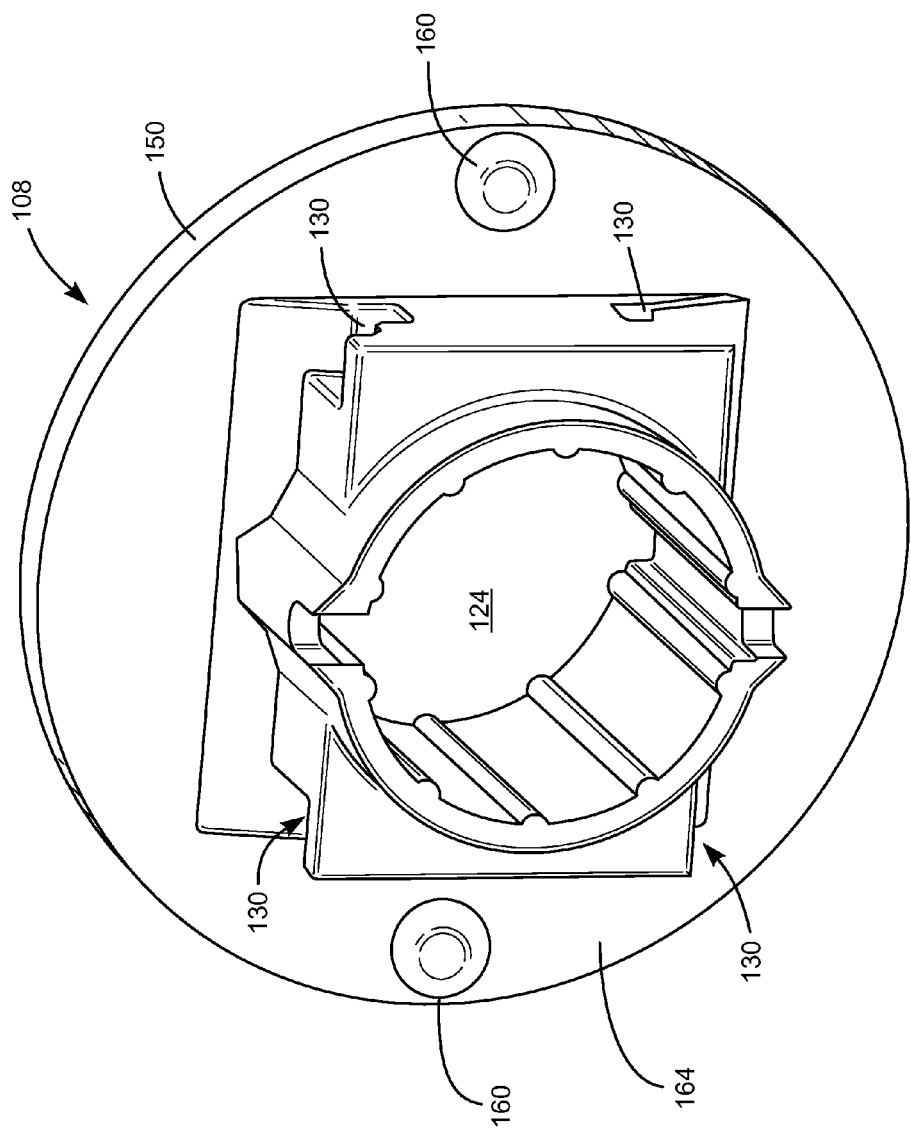
FIG. 4 is a perspective view of the sleeve of the centrifugal actuator switch shown in FIG. 1, FIG. 2, and FIG. 3 that shows the position of the protuberances that limit the movement of the biasing members.

As shown in FIG. 4, sleeve 108 is formed with a cylindrical bore 124 that extends from a first end to a second end of the sleeve 108 and that is configured to mount about the bracket 104 to enable axial movement of the sleeve with reference to the bracket 104 and the output shaft about which the bracket 104 is mounted. Sleeve 108 includes a collar 150, which is integrally formed as part of the sleeve 108, such as by injection molding, or attached to the sleeve by an adhesive or welding. The sleeve 108 also includes four openings 130 on diametrically opposite sides of the sleeve that receive pivot pins (not shown) of the weighted lever arms 112 and 118 to enable the weighted lever arms to pivot with reference to the sleeve 108.

Figure 3:
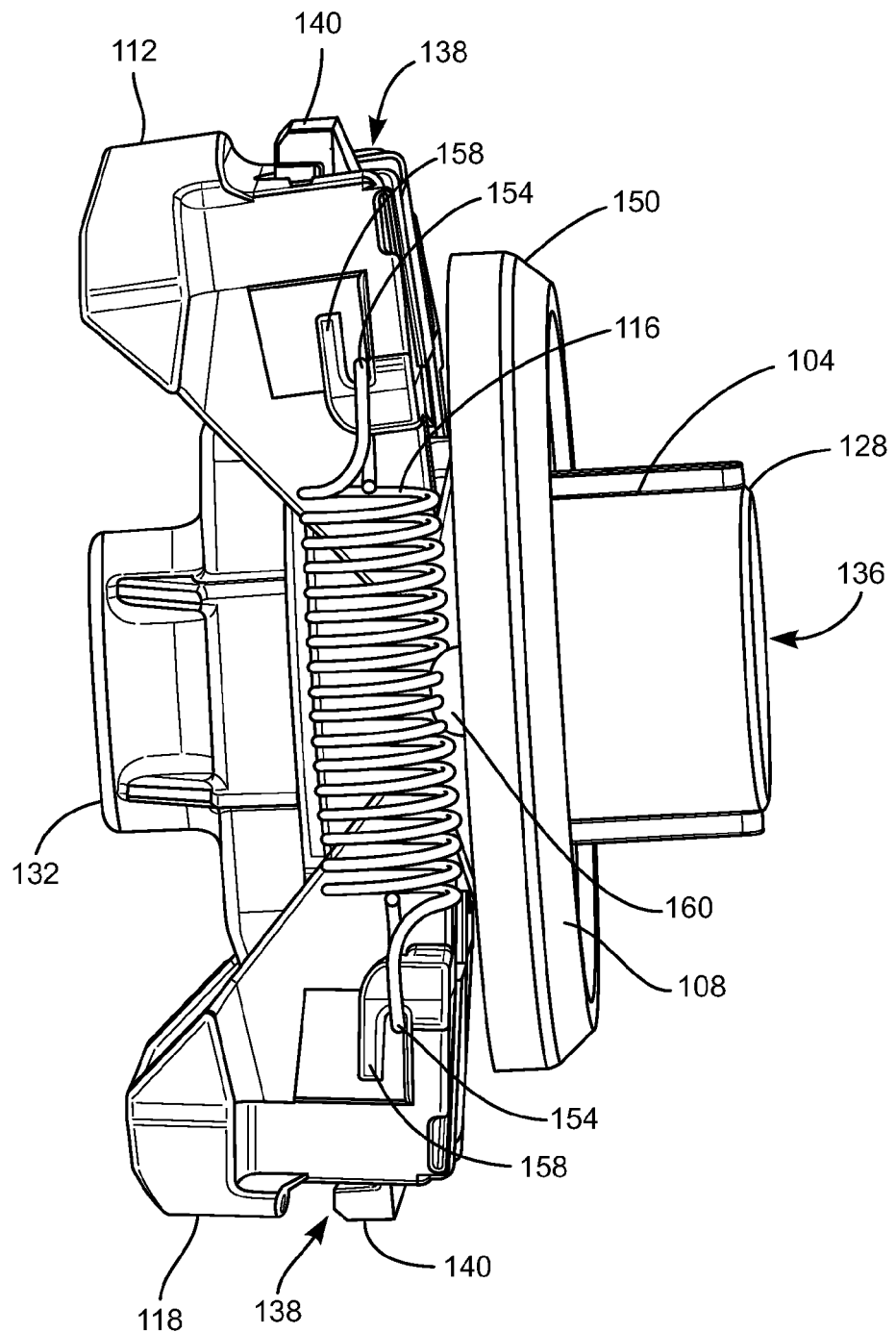
FIG. 3 is a perspective side view of the centrifugal actuator switch when the switch is in the state shown in FIG. 2.

In the side view of FIG. 1, each weighted lever arm 112 and 118 has an opening 138 (FIG. 1 and FIG. 3), which enables the arms 140 of the bracket 104 to extend through the weighted lever arms 112 and 118. As each of the weighted lever arms 112 and 118 pivots about the sleeve 108 under the effect of centrifugal force when the bracket 104 is rotating at a predetermined speed, they push against the arms 140 to move the sleeve 108 axially along the bracket 104 until they are fully extended as shown in FIG. 3. Only one biasing member 116 of a pair of biasing members 116 is shown in FIG. 1 and FIG. 3. The other biasing member 116 is located on the side of the sleeve 108 that is diametrically opposed to the side shown in FIG. 1 and FIG. 3. The biasing members 116 are depicted as coil springs in FIG. 1, although other biasing members, such as elastic bands and the like, can be used. Each biasing member 116 has a loop 154 at each end that is operatively attached to a lever hook 158 of the weighted lever arms 112 and 118 so the two biasing members are operatively connected between the weighted lever arms 112 and 118. Each of the biasing members 116 urge the weighted lever arms 112 and 118 to the retracted position shown in FIG. 1.

Figure 2:
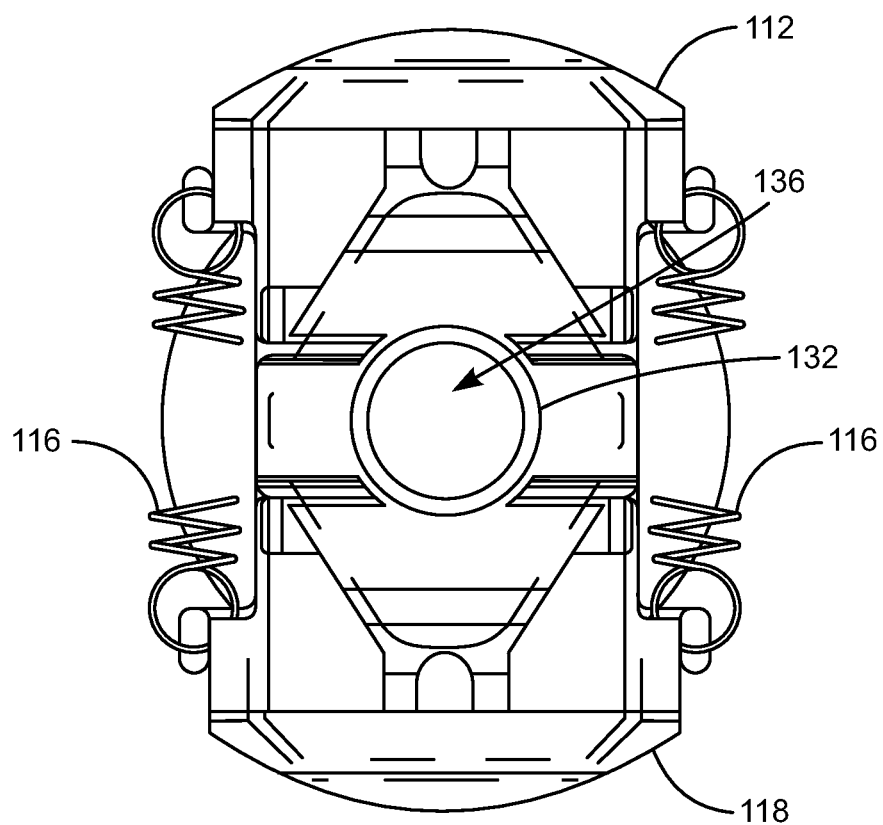
FIG. 2 is a perspective back view of the centrifugal actuator switch in FIG. 1 when lever arms on the switch are extended under the effect of rotating at a first predetermined rotational speed.

The pivoting of each weighted lever arm 112 and 118 occurs as the weight responds to centrifugal force generated by the rotation of the output shaft to which the bracket 104 is mounted as the output shaft reaches a predetermined rotational speed, which corresponds generally to the running or operational speed of the electrical motor. A back view of the centrifugal actuator switch with the weighted lever arms 112 and 118 in the extended position is shown in FIG. 2. This movement of the lever arms opens the contacts (not shown) that enabled electrical power to be applied to the start winding of the electrical motor. As the rotational speed decreases from the predetermined rotational speed, the biasing members 116 are able to overcome the centrifugal force acting on the weighted lever arms and return the lever arms to the retracted position. This movement reestablishes closure of the contacts so electrical power can be applied to the start winding if the motor is restarted.

As noted above, one problem arising from vibrations in an apparatus in which the motor having a centrifugal actuator switch is installed is movement of the ends of the biasing members 116 against the point of attachment to the weighted lever arms 112 and 118 of the centrifugal actuator switch. The resulting rubbing of the biasing member ends 154 against the lever hooks 158 of the weighted lever arms 112 and 118 can cause the ends of the biasing members or the lever hooks to break and release the biasing force. As a consequence, the switch no longer performs reliably and the motor is unable to start.

To address the movement of the biasing arms induced by vibrations, a pair of protuberances 160 has been formed on the collar 150 to engage the biasing arms 116 when they are in the extended position. Each protuberance 160 (FIG. 4) extends from a surface 164 of the collar 150. As shown in FIG. 4, each protuberance is a flattened hemisphere, although other shapes, such as a hemisphere, rectilinear, or other shape, can be used provided the structure is sufficiently high enough above the surface to engage the spring and limit its movement without rubbing the spring. Each protuberance 160 is positioned on diametrically opposed sides of the sleeve 108 to enable each protuberance 160 to engage the biasing members 116 positioned on the diametrically opposed sides of the sleeve 108. Each protuberance engages one of the biasing arms only when the lever arms are in the extended position and the sleeve has axially moved to enable each protuberance to engage the biasing member 116 on each side of the sleeve 108. This engagement steadies the biasing member and limits movement of each biasing member induced by vibrations of the centrifugal actuator switch.

Figure 5:
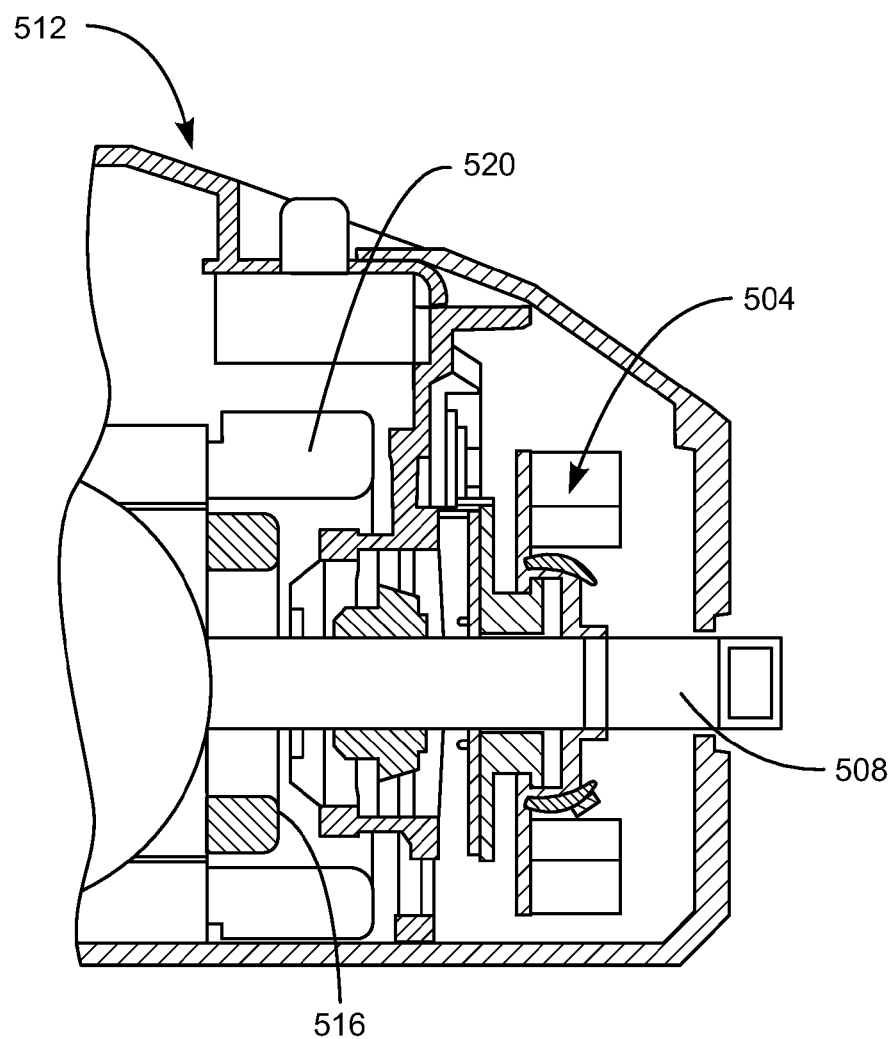
FIG. 5 is a sectional view of an electrical motor with the centrifugal actuator switch of FIG. 1-FIG. 4 mounted on the output shaft of the motor.

As shown in FIG. 5, a centrifugal switch actuator 504 can be mounted on an output shaft 508 of an electrical motor 512 and configured to couple a starting winding of the motor selectively to a power source. The bracket of the centrifugal switch actuator 504 is mounted about an output shaft 508 of the motor that extends from a rotor 516 within a stator 520 of the motor 512. As set forth above and shown in FIG. 1 to FIG. 3, the centrifugal actuator switch 504 includes a sleeve configured for axial movement about the output shaft 508 of the electrical motor 512 with the sleeve having a first end and a second end and a cylindrical bore extending from the first end of the sleeve to the second end of the sleeve. A collar is positioned about one end of the sleeve and a pair of weighted lever arms are pivotally mounted on diametrically opposed sides of the sleeve. A pair of biasing members are operatively connected between the weighted lever arms on diametrically opposed sides of the sleeve. A protuberance extends from diametrically opposed positions on the surface of the collar to enable the protuberances to engage one of the biasing members in response to the sleeve moving in response to the weighted arms pivoting about the sleeve as the output shaft rotates at a first predetermined speed. The protuberances help attenuate the wear that occurs from the ends of the biasing members engaging attachment points on the lever arms.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A centrifugal actuator switch comprising:
   a sleeve configured for axial movement about an output shaft of an electrical motor, the sleeve having a first end and a second end with a cylindrical bore extending from the first end of the sleeve to the second end of the sleeve;
   a collar positioned about one end of the sleeve;
   a pair of weighted lever arms pivotally mounted on diametrically opposed sides of the sleeve;
   a pair of biasing members, each biasing member being operatively connected between the lever arms on diametrically opposed sides of the sleeve; and
   a pair of protuberances, each protuberance being a flattened hemisphere that extends from a surface of the collar, each protuberance being positioned on diametrically opposed sides of the sleeve to enable each protuberance to engage one of the biasing members in response to the sleeve moving in response to the weighted lever arms pivoting about the sleeve as the output shaft rotates at a first predetermined speed.

2. The centrifugal switch actuator of claim 1 wherein the biasing members are springs.

3. The centrifugal switch actuator of claim 1 wherein the collar and the sleeve are integrally formed together.

4. The centrifugal switch actuator of claim 3 wherein the integrally formed collar and sleeve are an injection molded component.

5. An electrical motor comprising:
   an output shaft;
   a rotor mounted about the output shaft; and
   a centrifugal actuator switch including:
   a sleeve configured for axial movement about the output shaft of the electrical motor, the sleeve having a first end and a second end with a cylindrical bore extending from the first end of the sleeve to the second end of the sleeve;
   a collar positioned about one end of the sleeve;
   a pair of weighted lever arms pivotally mounted on diametrically opposed sides of the sleeve;
   a pair of biasing members, each biasing member being operatively connected between the weighted lever arms on diametrically opposed sides of the sleeve; and
   a pair of protuberances, each protuberance being a flattened hemisphere that extends from a surface of the collar, each protuberance being positioned on diametrically opposed sides of the sleeve to enable each protuberance to engage one of the biasing members in response to the sleeve moving in response to the weighted arms pivoting about the sleeve as the output shaft rotates at a first predetermined speed.

6. The electrical motor of claim 5 wherein the biasing members are springs.

7. The electrical motor of claim 5 wherein the collar and the sleeve are integrally formed together.

8. The electrical motor of claim 7 wherein the integrally formed collar and sleeve are an injection molded component.

* * * * *